Dec. 10, 1935. E. W. WESCOTT 2,023,942
PROCESS OF AND APPARATUS FOR EFFECTING REACTIONS BETWEEN SOLIDS AND GASES
Original Filed Feb. 28, 1929 5 Sheets-Sheet 1
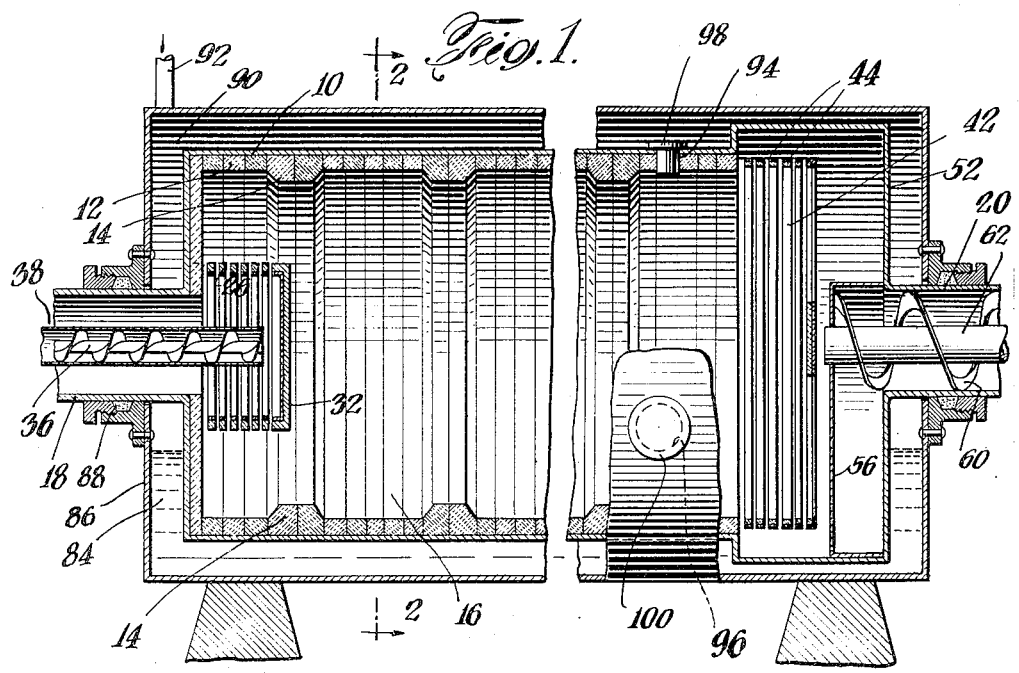
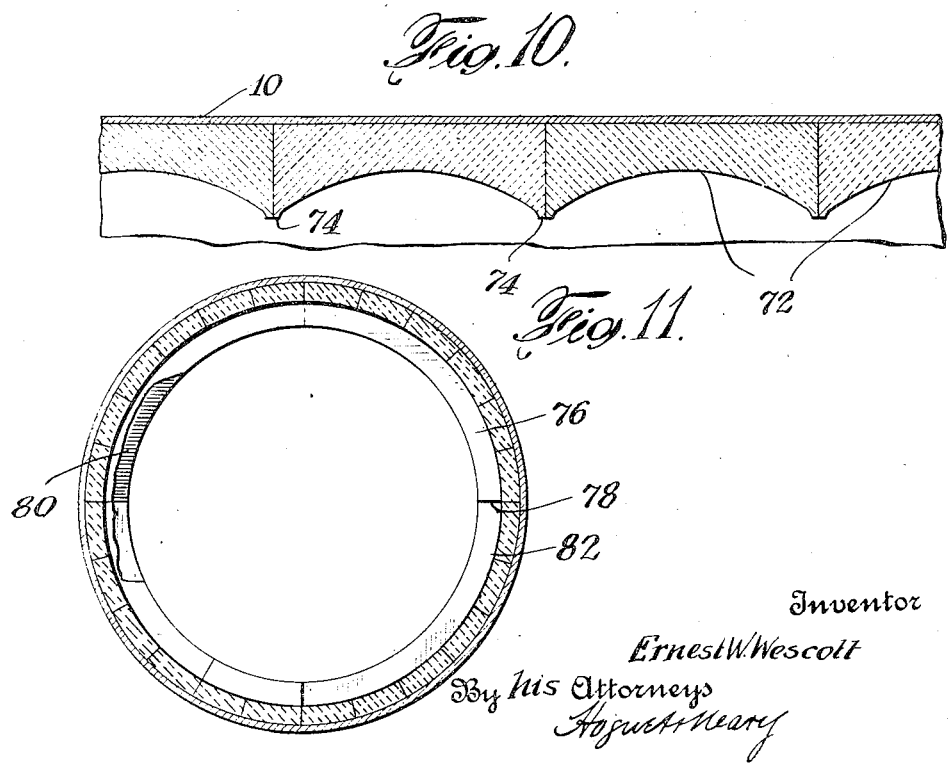
Inventor
Ernest W. Wescott
By his Attorneys Dec. 10, 1935.  E. W. WESCOTT  2,023,942
PROCESS OF AND APPARATUS FOR EFFECTING REACTIONS BETWEEN SOLIDS AND GASES
Original Filed Feb. 28, 1929   5 Sheets-Sheet 2
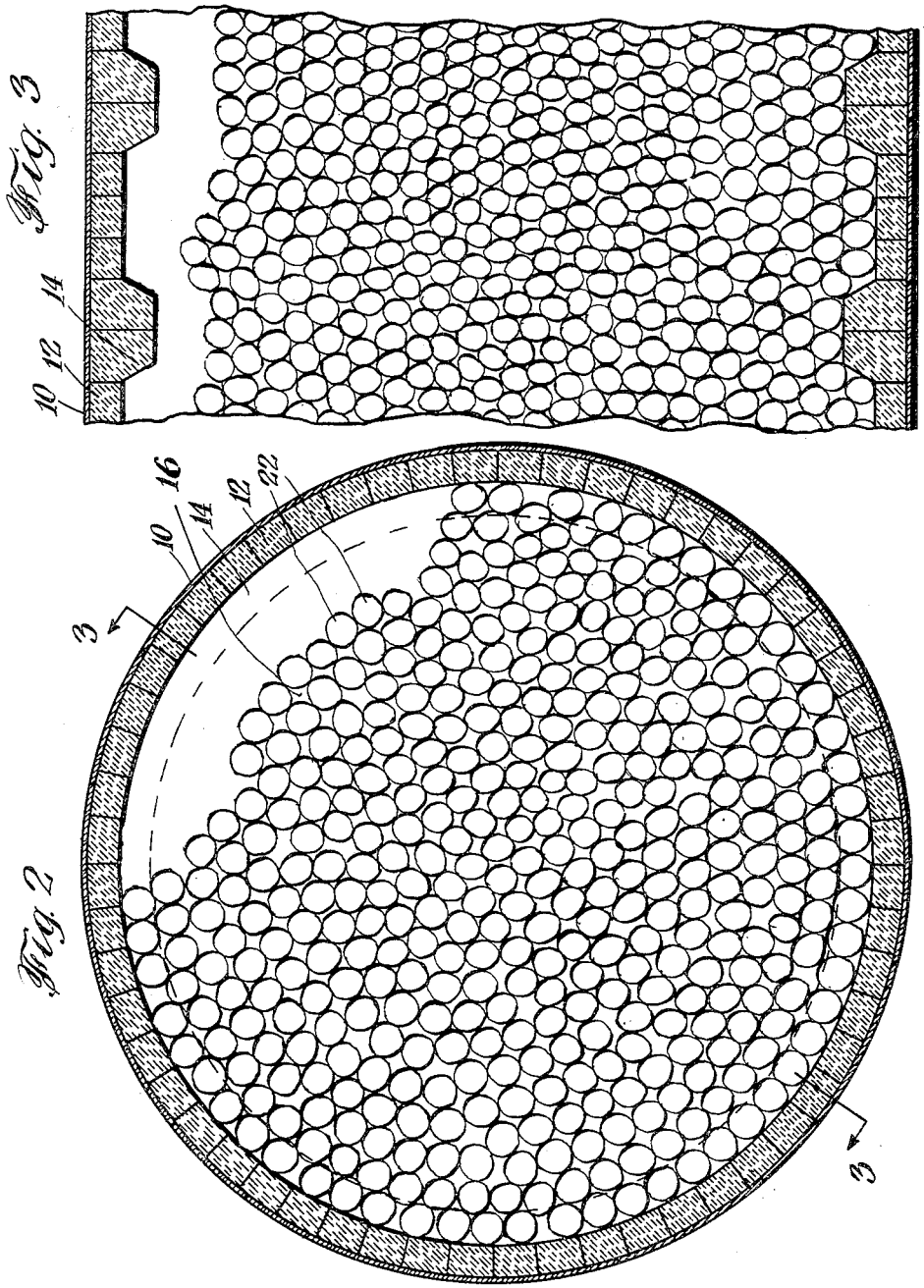
INVENTOR.
Ernest W Wescott
BY HIS
Hogurt+Neary
ATTORNEYS.

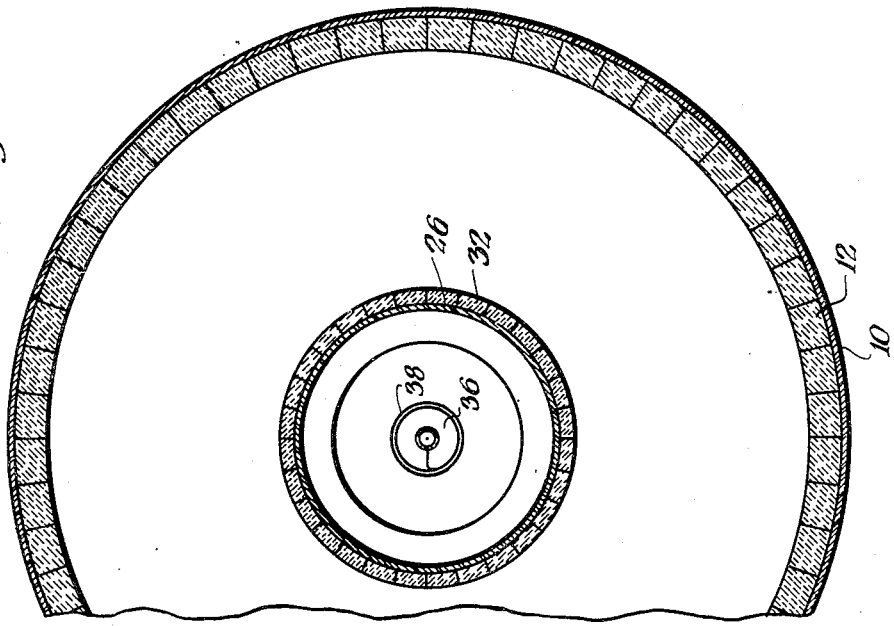
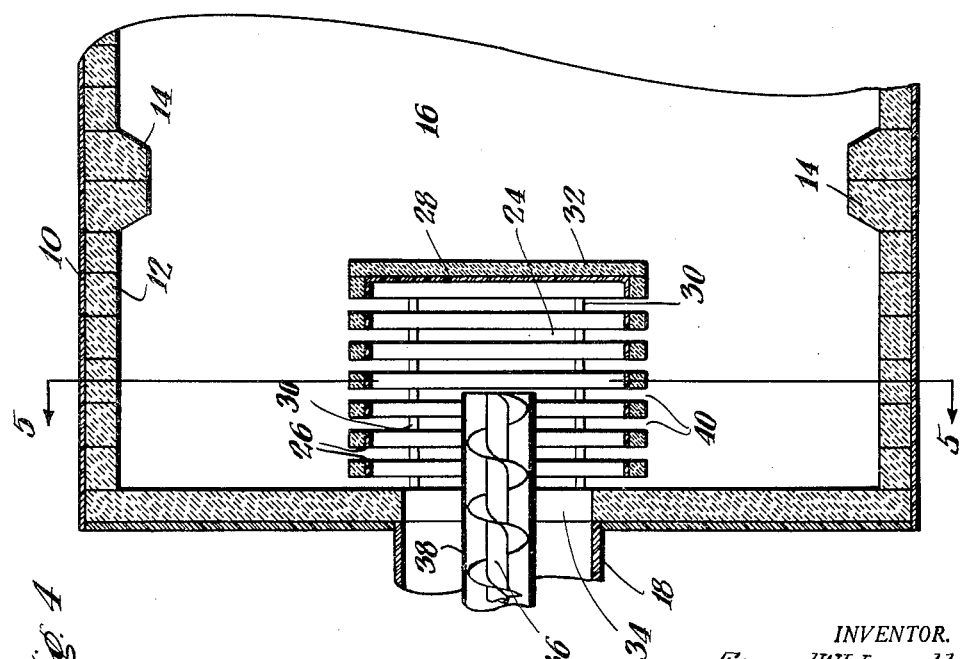
INVENTOR.
Ernest W Wescott
BY his
ATTORNEYS.

Dec. 10, 1935.  E. W. WESCOTT  2,023,942
PROCESS OF AND APPARATUS FOR EFFECTING REACTIONS BETWEEN SOLIDS AND GASES
Original Filed Feb. 28, 1929   5 Sheets-Sheet 4
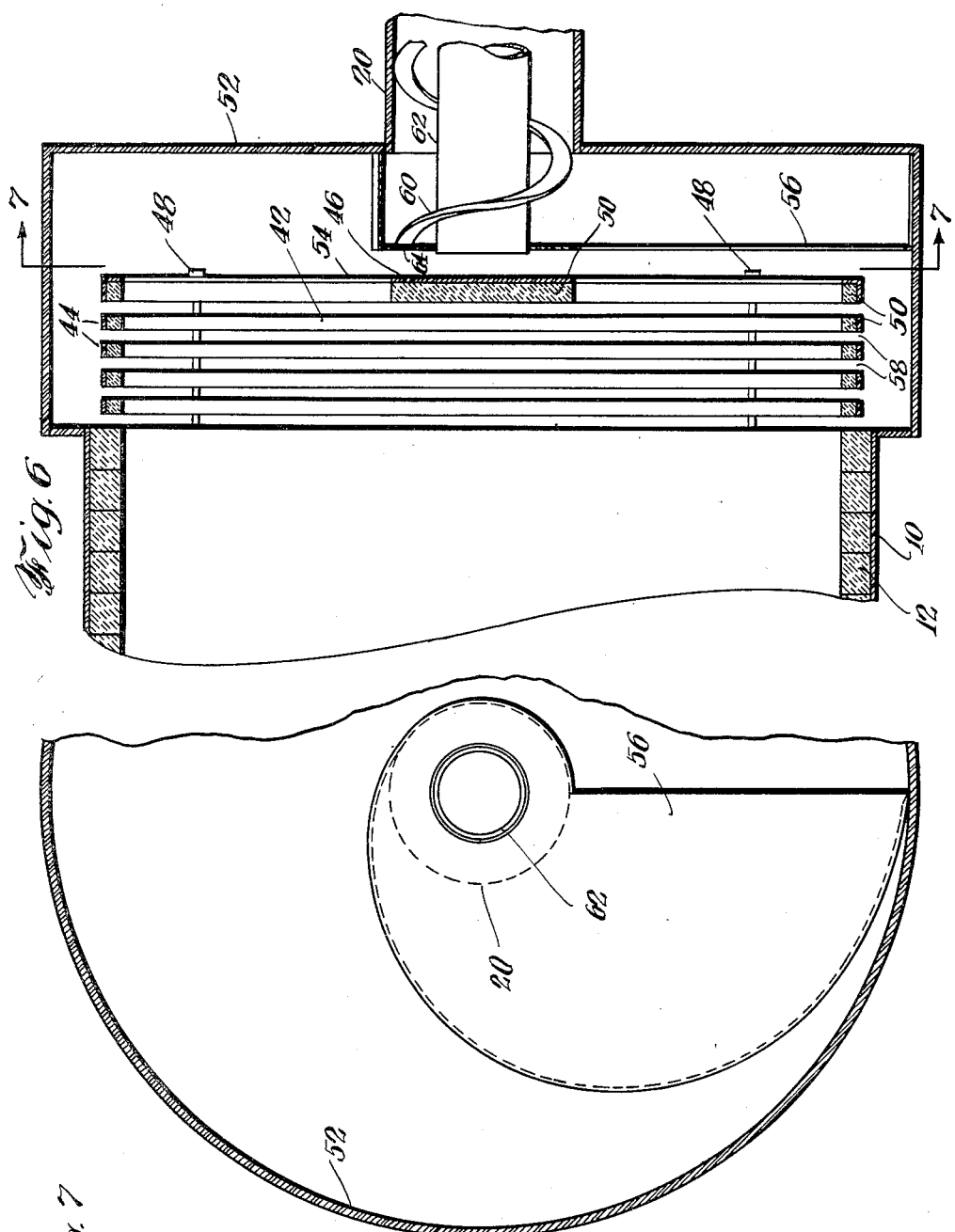
INVENTOR.
Ernest W Wescott
BY his
ATTORNEYS.

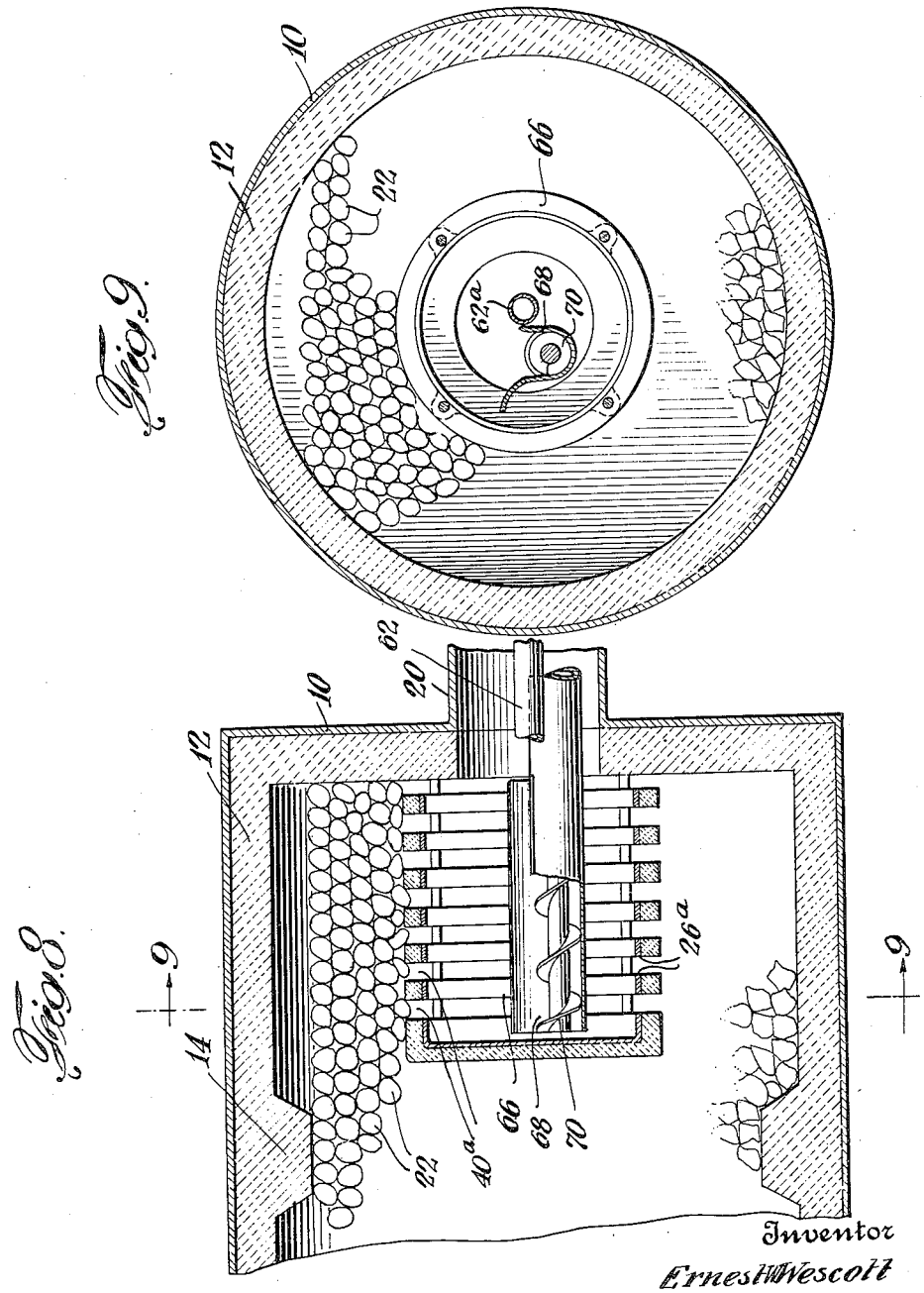

Patented Dec. 10, 1935

2,023,942

UNITED STATES PATENT OFFICE 2,023,942

PROCESS OF AND APPARATUS FOR EFFECTING REACTIONS BETWEEN SOLIDS AND GASES

Ernest W. Wescott, Niagara Falls, N. Y., assignor, by mesne assignments, to Sulphide Corporation, a corporation of Delaware Application February 28, 1929, Serial No. 343,266
Renewed April 25, 1935

11 Claims. (Cl. 75—67)

This invention relates to a process of, and apparatus for, carrying out reactions between finely divided solids and gases or vapors, and it comprises a process of effecting reactions between gases or vapors and granular or pulveriform solids particularly adapted for use in cases where either complete reaction of solids or complete utilization of the gaseous agent, or both, is required, wherein the material to be treated is introduced in a finely divided state into a loosely packed body of relatively coarse, closely sized inert material, such as balls, pebbles, brickbats or the like, and exposed to the action of a current of reacting gases passing through such loosely packed body while the same is being rotated under conditions promoting limited relative movement between the pebbles or other inert material and frequent changes in the positions of repose of the material to be treated therein, with consequent disposition of such material in numerous continuously changing piles and frequently interrupted falling streams substantially throughout the body of pebbles or other inert material.

The process in a preferred form also comprises continuous or intermittent feeding of the material to be treated, axially of the rotating body of pebbles, while exposed to the action of the reacting gases.

In addition to bringing about greater intimacy of contact between the solids and gases and thereby increasing the rate of reaction, the present process has as an aim to subject the material to be treated to a mild abrasive action for the purpose of loosening and removing, at least to some extent, solid reaction products formed on the surfaces of the particles of the material under treatment so that complete reaction may be more readily effected.

The invention further comprises means adapted for use in the performance of the described process comprising a rotatable chamber nearly but not completely full of loosely packed balls or pebbles of inert nature, means for retaining the pebbles in said chamber while permitting flow therethrough of finely divided material to be treated, means for controlling the temperature of the chamber, means for supplying a gas or vapor and causing it to pass through the body of loosely packed balls or pebbles in intimate contact with solid material disposed therein, means for removing solid reaction products and means for removing waste gases and for supplying solid material to be treated; all as more fully hereinafter set forth and as claimed.

Efficient treatment of finely divided solids offers considerable difficulty in either batch or continuous operation in any case, and particularly when solid products of reaction are formed. With a quiescent charge or batch of finely divided material, completion of penetration and reaction is commonly very slow, and the charge is apt to become impervious, particularly if swelling occurs. In continuous processes using apparatus with mechanical rabbles, the capacity of any given equipment is very low, particularly if complete reaction, is required both of the solids and of the gases or of either of them. Using a rotary inclined kiln or drum carrying a thin traveling agitated stream, the speed of reaction and efficiency as regards the ore are moderate but the utilization of gas is poor. Hot gases ascend to and travel through the upper segment without efficient contact with the material under treatment. Flights or lifts—internal shelves in the lining of a rotary kiln, designed to lift the solids and dump them down through the gases—help, but kilns so equipped are still very inefficient as a means of effecting contact between solids and gases.

According to the present invention, I employ apparatus of the rotary kiln or Brückner cylinder type and nearly but not completely fill it with a loosely packed body of balls, pebbles or the like, composed of material inert to the actions going on, such as well vitrified brick, porcelain or other dense, hard ceramic material. In some cases broken rock can be used, in others metal balls. When metal balls are used they should preferably be cast hollow as the great weight required in ball mill crushing is not needed for the purposes of this invention. Brick bats—roughly cubical brick shapes—are cheap and may be used where sharp edges are desirable to exert some scouring action on the walls, assisting in preventing the formation of accretions. However, owing to the tendency of brick bats to pile up with the flat surfaces in contact thus decreasing the porosity of the charge, it is preferable to use balls or other shapes of irregular contour.

With the kiln filled as above described and set in rotation, if fine solid material is introduced at one end, it travels in tortuous paths therethrough as a series of constantly changing piles on the pebbles or other bodies of the type indicated and as a series of showers or clouds in the spaces between the pebbles and in the free space above the body of pebbles. While the fine solid material is so travelling, portions of it will be present at all times at all or very nearly all points in the cross section of the kiln. Contact of solids and gases, is highly efficient. The pebbles during rotation of the kiln have a small relative movement and subject the solid material undergoing treatment to mild abrasion, thereby tending to remove any solid reaction product that may form upon the surfaces of the granules and to expose fresh surfaces to the action of the passing gases.

The portion of the drum unfilled with pebbles and intermixed solid material is relatively small and baffle means may be disposed at intervals therein to divert into the body of pebbles and solid material any gases which otherwise might pass along the unfilled space without coming into contact with material to be treated. Owing to the uniform distribution of the reacting gas and solid material throughout the body of pebbles the localization of heat given off during the reaction is minimized.

The action differs from that of a ball mill, in which the rotating chamber is rarely filled more than slightly over half full, in that no substantial fall of pebbles to produce a pounding action is wanted; the pebbles have a rubbing action but their main function is to produce distribution and contact of passing gases and solids. The rubbing action may be controlled to a considerable extent by the tightness or looseness with which the pebbles are packed; this being determined by the height at which the pebbles are kept in the reaction chamber.

The chamber when relatively short may be set horizontal and the lengthwise feed of fine solid material therethrough will take place by reason of the fact that the solids exist at a high level at the feed end and at a low level at the discharge end. Because of the great contact efficiency obtained, the chamber can usually be larger in diameter but shorter than heretofore considered permissible. With long chambers it may be desirable to have the axis set at some inclination to the horizontal to assist in the passage of fine materials. When this is done, it is usually desirable to have one or more grids distributed along the length of the reaction chamber to take the thrust of the mass of pebbles which would otherwise be excessive at the lower end of the chamber, and to prevent too tight packing of the pebbles in the lower end.

Instead of providing deflecting baffles to prevent straight line flow of gas through the unfilled portion of the rotating chamber above the body of pebbles, the desired intimate contact between the reacting gas and the solid material to be treated may be brought about by providing, at spaced points longitudinally of the kiln, portions of increased diameter, and filling such enlarged portions nearly but not completely full of pebbles, so that in these portions the pebbles may have sufficient relative movement to produce mild abrasion of the granules of solid material passed therethrough. In this modification, the intervening portions may be substantially completely filled with pebbles, thereby positively assuring that the reacting gases passing through such portions shall penetrate the body of pebbles and intermixed material disposed therein. The enlarged portions above mentioned may be formed by varying the diameter of the metal shell of the kiln. Alternatively, the metal shell may be constructed of uniform diameter and the enlarged portions produced by varying the thickness of the lining.

When operating with some kinds of materials and gases, and for some purposes, the gases that enter the free space above the body of pebbles are aspirated into the tumbling body of solids and pebbles so completely, by the showering action of the falling material, that it is not necessary to provide any baffling means in the reaction chamber. This aspirating effect will, of course, vary somewhat with the rate of rotation of the kiln, with the fineness and specific gravity of the solid material undergoing treatment, and with the kind of gaseous reagent employed. As an example, iron pyrites in finely-divided form may be effectively treated with sulfur chlorid to produce ferrous chlorid and free sulfur without the by-passing of any substantial amount of the sulfur chlorid vapours through the space above the pebbles even when the deflecting baffles are not provided in the reaction chamber.

While the process hereinbefore described is generally applicable in carrying on reactions between solids and gases wherein the resulting products are either solids, solids and gases or vapors, or gases or vapors alone, I shall hereinafter, by way of example, describe the process as applied to the chlorination of sulfid ores, in particular ores containing iron sulfid.

In the drawings, Fig. 1 is a longitudinal section through one form of the apparatus of the present invention with the pebbles omitted;

Fig. 2 is a vertical section taken on the line 2—2 of Fig. 1, but on a somewhat larger scale with the chamber filled with pebbles as in actual operation;

Fig. 3 is a fractional longitudinal sectional view taken on the line 3—3 of Fig. 2;

Fig. 4 is a vertical sectional view of the feed or ore inlet end of the reaction chamber with part of the feeding means omitted;

Fig. 5 is a section, partly broken away on the line 5—5 of Fig. 4;

Fig. 6 is a vertical sectional view of the discharge end of the reaction chamber;

Fig. 7 is a fragmentary part section and part elevation on the line 7—7 of Fig. 6;

Fig. 8 is a vertical longitudinal section showing a modified form of discharging mechanism;

Fig. 9 is a vertical section on the line 9—9 of Fig. 8;

Fig. 10 is a fragmentary longitudinal section showing a modified form of lining for effecting the baffling of the gases;

Fig. 11 is a vertical section through the reaction chamber with a slightly different arrangement of the baffles than is shown in Figs. 1, 2 and 3.

In the form of the apparatus shown in Fig. 1, a cylindrical metal shell 10 is provided with a refractory lining 12 having spaced annular inset portions 14 the purpose of which will be hereinafter further explained. Joined to the end walls of the reaction chamber so formed are cylindrical metal shells or tubes 18 and 20 of reduced diameter, serving, respectively, to define an inlet for the incoming ore or other solid material to be treated and an outlet for the solid reaction product. The shells or tubes 18 and 20 in the form of the apparatus shown in Fig. 1 act as trunnions by means of which the reaction chamber may be rotated and at least in part supported by suitable means not shown.

The reaction chamber 16, as shown in Figs. 2 and 3, is almost but not completely filled with pebbles 22. In the apparatus illustrated in the drawings, the unfilled space is shown as not extending substantially below the lower edges of those segments of the inset portions 14 moving through the unfilled portion at any given time during rotation of the chamber in operation. The position such unfilled space assumes during rotation of the chamber and its relation to the inset portion 14 are indicated in Fig. 2, in which the reaction chamber is assumed to be rotating in the direction indicated by the arrow. As the chamber rotates, a small relative movement takes place between the pebbles thereby mildly abrading particles of ore or other solid material being treated which may happen to be confined between the impacting pebbles, or between falling pebbles and the lining 12, and at the same time promoting the showering of particles not directly abraded down through the interstices between the pebbles and increasing their exposure to the passing reactive gases. As hereinbefore mentioned, the showering action of the falling materials (solid material undergoing treatment and pebbles) may be such as to cause the gases entering the free space to be drawn down into the tumbling body of solids and pebbles and in this way effectively prevent by-passing of gases through the chamber, thus eliminating any need for the deflecting baffles.

In order to feed the ore or other solid material to be treated to the reaction chamber without interference from the pebbles 22, an inlet distributing basket 24 is provided. This distributing basket may take various forms. In the form shown, it consists of a plurality of spaced metal rings 26 and an end plate 28 all secured together and to the end of the reaction chamber by bolts or equivalent means 30. The rings 26 and the end plate 28 may be covered with suitable refractory material 32 on their outer side,—the side in contact with the pebbles in the chamber 16 and exposed to the scouring action of the pebbles. This is particularly important in case the reacting gases tend to react with iron or other constituents of the metal, since the compounds thus formed often tend to act as a protective covering against further attack unless they are removed by abrasion or otherwise. For example, if a chlorinating gas be present in the reaction chamber, iron or steel coming in contact therewith tends to protect itself by a thin layer of chlorid and does not suffer further corrosion unless such layer is removed. The refractory covering 32 may, however, be dispensed with in certain cases by using high chrome steels or other alloys that are resistant to wear and to corrosion by the gases or other corrosive materials present.

The distributing basket is disposed in axial alignment with the inlet opening 34 communicating with the tube 18. Disposed within the tube 18 and extending to a point within the basket 24 is a suitable feeding means, such for example as the helical screw 36 within the pipe 38 leading from a source of ore or other material to be treated, not shown. In operation finely divided solid material, introduced within the basket by the screw or other feeding means, falls through the spaces 40 between the rings 26, enters the interstices of the body of pebbles, and as the chamber and the contained pebbles rotate, gradually feeds forwardly in the reaction chamber while being continuously lifted by and showered down upon lower pebbles in short and frequently interrupted falling streams substantially throughout the body of pebbles.

By keeping the chamber almost but not completely filled as above described, a certain amount of relative movement between the pebbles is permitted and at the same time any reactive gases that may rise into the free space above the pebbles will be diverted by the aspirating action of the falling solids and/or the insets or baffles 14 back into the body of pebbles in reactive relation with the solid material contained therein and thereby will be prevented from by-passing the material with which it is to be reacted.

The degree of dispersion or suspension of the solid particles in the gaseous atmosphere in the interstices of the pebbles and in the free space above the body of pebbles may be varied considerably by varying the rate of rotation of the reaction chamber in operation. The reaction chamber will be rotated at such a rate, taking into consideration the various factors of fineness, chemical reactivity and other physical and chemical properties of the solid material, cross-sectional area and length of the reaction chamber, size of pebbles, rate of feed of solid material and reacting gas, as will insure the desired period of contact between the solid material and the reacting gas during their countercurrent travel through the chamber. These respective factors vary considerably for different materials and different gaseous reagents but the optimum conditions for any particular material and gas may be ascertained by conducting relatively simple experiments having in mind the functions of the apparatus and the objects to be accomplished.

The discharge of the solid reaction products formed in the reaction chamber and/or any residual constituents of the material introduced at the feed end, may be accomplished by means of the discharging means shown in Figs. 6 and 7. This is shown as comprising a discharge basket 42 made up of a plurality of spaced metal rings 44 and an end plate 46, all secured together and to the wall of the chamber 16 by bolts or other suitable means 48. The rings 44 and the end plate 46 may be lined with refractory material 50. Surrounding the discharge basket and spaced therefrom is a hood 52 which may be integrally joined to the shell 10 or may be so formed as to constitute an extension thereof. As shown in Fig. 6, the hood is of somewhat larger diameter than the shell 10. Alternatively, particularly when a relatively thick lining 12 is used in the reaction chamber portion of the shell 10, or when the outlet from the reaction chamber to the basket is suitably restricted, as for example by insetting or thickening the lining adjacent such outlet, the hood 52 may be of the same diameter as, and form an extension of, the shell 10.

The end plate 46 is provided with radial openings or slots 54 sufficiently restricted to prevent the pebbles from passing through, but of such size that the solid reaction product or other material contained within the pebble body may easily pass through.

Secured to the end of the hood 52 and adapted to rotate therewith is a scoop 56, which as it revolves with the hood picks up the solid material that has fallen through the openings 54 and the openings 58 and carries it to the screw 60 disposed within the tube 20. Axially disposed in the tube 20 is a gas inlet pipe 62 which passes through the scoop 56 and discharges into the space between the discharge basket 42 and the end wall of the hood 52. The screw 60 may be secured to the side wall 64 of the scoop and to the wall of the tube 20 and rotate therewith, or alternatively, it may be stationary, while the tube 20 rotates with the hood 52 to which it is integrally joined.

In Figs. 8 and 9 there is shown a modified form of discharging means in which a discharge basket 66, in general respects similar to the inlet distributing basket 24, is provided at the outlet end of the kiln. Extending into the interior of the basket 66 through the outlet tube 20 is a trough 68 carrying a helical screw conveyor 70. The trough 68 is positioned to one side of and below the center of the basket,—to the left when the kiln is being rotated in a clockwise direction, as shown in Fig. 9, and to the right when the kiln is being rotated in a counterclockwise direction. The pipe 62a for introducing the reacting gases may be disposed at one side of the trough 68 or dispensed with altogether, if desired, the reacting gases being then introduced directly through the tube 20. In the operation of the form of discharging means just described, the solid material to be discarged is carried up with the pebbles surrounding the basket 66 and showers down through the openings 40a between the rings 26a into the trough 68 whence it is withdrawn through the tube 20.

It will be understood that when baffles are used for diverting the reacting gases from the free space above the pebbles they may take different forms than that shown in Figs. 2 and 3. An example of a modified form is shown in Fig. 10, in which the lining of the kiln is shown as having formed therein a series of annular depressions 72 concave in cross-section and at their points of intersection 74 defining baffles for diverting the reacting gases that rise into the free space above the pebbles back into the body of pebbles.

Instead of baffles each consisting of a complete annulus, as shown in Figs. 2 and 3, the baffles may each consist of a partial annulus, the breaks in the respective annuli of a series being offset so that when the break in a given annulus moves into a free space above the pebbles the broken parts of the adjacent annuli will be beneath the surface of the body of pebbles, thereby preventing bypassing of the reacting gases through more than two adjacent sections. Such a construction is shown in Fig. 11 in which an annulus 76 is shown as extending only approximately three-quarters of the way around the kiln. Diametrically opposite the break 78 in the annulus 76 is shown in dotted line the position of the break 80 in the next succeeding annulus 82.

Suitable means for controlling the temperature of the kiln may be provided when solids and gases requiring application of heat for initiating or accelerating reaction are to be treated or when there is an excess or deficiency of heat during regular operation. A means which may be employed to effect uniform heating of the kiln, particularly where the reactions to be carried out are exothermic in character and it is desired to transmit heat given off in one portion of the kiln to another portion thereof, is shown in Fig. 1. In Fig. 1, the kiln is shown as mounted to rotate in a lead bath 84 contained within the outer metal drum 86. The drum 86 entirely encloses the kiln, and access of air to the drum through the openings in the ends through which the tubes 18 and 20 pass, is prevented by providing suitable sealing means such as the stuffing boxes 88. In order further to protect the molten lead from oxidation, a suitable non-oxidizing gas such as nitrogen, carbon monoxide, etc., is introduced to the space 90 above the lead bath through the inlet pipe 92. Any suitable means for bringing the lead bath to a molten state in starting the operation, for maintaining it molten during temporary shut-downs or for supplying or removing heat during operation may be provided; the lead bath serving in each case to produce uniformity of temperature. In order to conserve heat, the shell 86 containing the lead bath will usually be heavily heat insulated over its entire surface.

While the use of the lead bath is desirable in controlling the temperature of the kiln and in supporting same, it will be understood that the lead bath may be dispensed with and that the kiln may be supported and rotated by means of tires and driving gear such as are employed in cement kilns and the like. According to another modification, the kiln when supported and rotated in the manner immediately above described, may be provided with double metallic walls forming an annulus which may be filled to any desired extent with a heat distributing heavy liquid such as lead. In this case, when it is desired to keep the temperature of the kiln constant along its length, the annulus should be provided with baffles serving to cause circulation of the molten lead in a direction parallel to the axis of the kiln.

In order to put the kiln in operation, the chamber 16 is first filled with balls, pebbles or similar inert material of the kinds hereinbefore indicated. For this purpose openings 94 (one only of which is shown) may be provided at spaced points along the length of the kiln, such openings being so positioned that they may be brought into register with openings 96 in the drum 86. When the chamber is filled the openings 94 and 96 are sealed by suitable closures 98 and 100.

The lead bath, in addition to its functions of transmitting heat from one portion of the kiln to another and of transmitting heat from an outside source, or of collecting and transmitting heat from the kiln to an outside cooling agent also performs another useful function; namely, that of supporting the weight of the kiln and its contents to an extent controllable by varying the level of the lead bath, thereby relieving the tubes or trunnions 18 and 20 and their supporting bearings, not shown, of a predetermined part of the downward thrust due to the weight of the kiln and its contents.

As a specific example of an application of the process, let us assume that it is to be used to carry out that step of the process set forth in my Patent No. 1,898,702, dated February 21, 1933, in which a sulfid ore of iron, such as pyrites, is reacted with sulfur chlorid to produce ferrous chlorid and free sulfur.

Heat having been applied to bring the temperature throughout the reaction chamber above the volatilization point of the sulfur released through the reaction,—at or above approximately 330° C. under conditions of normal atmospheric pressure when the sulfur chlorid used represents that dilution with an inert gas that is obtained when a dilute chlorin mixture containing about 22% chlorin and 78% nitrogen is passed over hot sulfur to produce complete saturation of the chlorin,—iron pyrites, preferably in finely pulverized form, is fed into the chamber through the ore supply pipe 38, and as the chamber is rotated, is gradually fed forward and distributed through the pebble body in the manner hereinbefore described. Concurrently with the feeding of the ore, sulfur chlorid vapors from a generator, not shown, and diluted with an inert gas such as nitrogen, are introduced through the pipe 62. The sulfur chlorid vapors are substantially uniformly distributed through the pebble body and in travelling through the reaction chamber react with the iron sulfid to produce ferrous chlorid and free sulfur.

The sulfur vapors with the diluent nitrogen or other inert gas present are withdrawn through the pipe 18 to a suitable condenser, not shown, where they are separated from the diluent gases and condensed. The ferrous chlorid formed, being solid at the temperatures employed, passes out of the pebble body through the discharge basket 42 whence it is picked up by the revolving scoop 56 and discharged through the pipe 20.

It will be understood that a similar procedure will be employed in reacting other solids and gases, suitable variations being made in the temperature and pressure conditions, rate of feed, etc., depending upon the physical and chemical properties of the material being reacted. As examples of other applications of the process, the purification of aluminum oxid according to the process of U. S. patent to Tone No. 1,099,674, and the conversion of ferrous chlorid to ferric chlorid according to the second step of the split cyclic process set forth in my Patent No. 1,898,702, may be mentioned.

It will be understood that the solids treated according to the process herein described may or may not include constituents, such as gangue, etc., that are inert or partially inert to the desired reactions.

Wherever the term "pebbles" appears in the claims it is to be understood as including not only balls, pebbles, brick bats, special refractory shapes, sized crushed rock, etc. but also any suitable masses or lumps of material having very large dimensions as compared with the particles of comminuted ore. The "pebbles" need not necessarily be strictly inert to the actions going on although this will usually be the case for economic reasons. The pebbles must always, however, be such that under operating conditions there will be maintained a large interstitial volume or free space between them for ore and gases, usually amounting to from 30 to 45% of the combined volume of the pebbles and voids.

What I claim is:

1. Process of effecting reaction between a solid and a gas reactive therewith, which comprises rotating a loosely packed body of pebbles in a reaction zone nearly but not completely filled with said pebbles and thereby promoting limited relative movement between said pebbles, feeding the solid in comminuted form to one end of said rotating pebble body, causing said solid to feed through said pebble body, and simultaneously therewith, passing a stream of a reactive gas through said pebble body in countercurrent relation to said solid.

2. Process of effecting reaction between a solid and a gas reactive therewith, which comprises rotating a loosely packed body of pebbles in a reaction zone nearly but not completely filled with said pebbles and thereby promoting limited relative movement between said pebbles, feeding the solid in comminuted form to one end of said rotating pebble body, causing said solid to feed through said pebble body, simultaneously therewith passing a stream of a reactive gas through said pebble body in reactive relation to said solid to produce as reaction products a solid and a vapor, and separately removing the reaction products during the course of the operation.

3. In the process of chlorinating sulfid ores containing iron, the steps which comprise producing limited relative movement between the respective pebbles of a loosely packed body thereof in a reaction zone nearly but not completely filled with said pebbles, feeding the ore to and through the body of moving pebbles, simultaneously therewith passing a stream of a chlorinating gas therethrough, so regulating the rates of feed of the ore and chlorinating gas as to insure that the chlorin content of said gas shall be substantially completely fixed in the form of metal chlorids in passing through said pebble body, and separately removing the reaction products during the course of the operation.

4. The process of chlorinating sulfid ores containing iron, which comprises rotating a loosely packed body of pebbles in a reaction zone nearly but not completely filled with said pebbles and thereby promoting limited relative movement between said pebbles, feeding the ore in comminuted form to one end of said rotating pebble body, causing said ore to feed through said pebble body, simultaneously therewith passing a stream of sulfur chlorid vapors therethrough in reactive relation to said ore, so regulating the rates of feed of the ore and chlorinating gas as to insure that the chlorin content of said sulfur chlorid shall be substantially completely fixed in the form of metal chlorids in passing through said pebble body, and separately removing the reaction products during the course of the operation.

5. Apparatus for effecting reactions between solids and gases comprising a rotatable, substantially horizontally disposed reaction chamber, pebbles disposed in loosely packed relation in said chamber and filling same to a line above the longitudinal axis thereof, means dividing the free space above the free surface of the pebbles into a plurality of indirectly communicating compartments, and means for introducing reactive gases into said chamber.

6. Apparatus for effecting reactions between solids and gases comprising a rotatable, substantially horizontally disposed reaction chamber, pebbles disposed in loosely packed relation in said chamber and nearly but not completely filling the same, said pebbles being present in such quantity as to limit the space above the normal level of the body of such pebbles to such an extent as to insure that the aspirating effect of such pebbles and of solids associated therewith during rotation of said chamber shall be such as to prevent channeling of gases through said space, and such as to cause gases in said space to be repeatedly brought down into the interstices in the pebble body during the course of their travel through the chamber, means for feeding solid material in comminuted form to one end of said chamber, means for withdrawing solid material in comminuted form from the opposite end of said chamber, and means for introducing reactive gases to said chamber and for causing them to pass therethrough in reactive relation with the solid material within the interstices of the pebble body.

7. Apparatus for effecting reactions between solids and gases comprising a rotatable, substantially horizontally disposed reaction chamber, baffles projecting inwardly from the walls of said chamber at spaced points in the length thereof, pebbles disposed in loosely packed relation in said chamber and nearly but not completely filling same, said pebbles being present in such quantity as to insure that they will cooperate with said baffles when the chamber is being rotated to divide the free space above the line of repose of the pebbles into a plurality of indirectly communicating compartments, and means for introducing reactive gases into said chamber.

8. Apparatus for effecting reactions between solids and gases comprising a rotatable, substantially horizontally disposed reaction chamber having at least one portion of relatively restricted diameter disposed between the ends thereof, thereby forming adjacent zones of greater and lesser cross sectional area, and pebbles in the adjacent zones, the quantity of pebbles being sufficient to substantially fill the zones of lesser capacity, and the upper level of the pebbles in all zones being substantially the same, and means for introducing reactive gases into said chamber.

9. Apparatus of the rotary kiln type for effecting reactions between comminuted solids and gases comprising a rotatable chamber varying in effective internal diameter, a charge of pebbles disposed in said chamber, said charge of pebbles being present in such quantity as to nearly but not completely fill said chamber and co-operating with the variations in the internal diameter of said chamber to define a multiplicity of possible gas paths from end to end of said chamber and substantially wholly confined within the pebble charge, said paths so defined being irregular in cross section and frequently changing in direction, and substantially all of said paths being so disposed as frequently to pass in proximity to freshly exposed particles of comminuted solids disposed within the charge of pebbles and means for introducing reactive gases into said chamber.

10. Apparatus for effecting reactions between solids and gases comprising a substantially cylindrical and horizontally disposed reaction chamber having at least one portion of relatively restricted diameter disposed between the ends thereof, thereby forming adjacent zones of greater and lesser capacity, pebbles in the adjacent zones, the quantity of pebbles being sufficient to substantially fill the zones of lesser capacity, and the upper level of pebbles in all zones being substantially the same, a distributing means adjacent one end of the chamber for feeding a comminuted solid to the body of pebbles while preventing escape of the pebbles from the chamber, means adjacent the opposite end of said chamber for discharging solid material from the pebble body while preventing escape of the pebbles, and means for introducing reactive gases into said chamber.

11. Apparatus for effecting reactions between solids and gases comprising a rotatable, substantially horizontally disposed reaction chamber having at least one portion of relatively restricted diameter disposed between the ends thereof, thereby forming adjacent zones of greater and lesser capacity, pebbles in the adjacent zones, the quantity of pebbles being sufficient to substantially fill the zones of lesser capacity, and the upper level of the pebbles in all zones being substantially the same, means for supporting said chamber comprising a heavy liquid bath, means for rotating said chamber, distributing means adjacent one end of said chamber for feeding comminuted solid material to the body of pebbles while preventing escape of the pebbles from the chamber, means adjacent the opposite end of said chamber for discharging solid material from the pebble body while preventing escape of the pebbles and means for introducing reactive gases into said chamber.

ERNEST W. WESCOTT.